United States Patent
Tamura et al.

(10) Patent No.: US 12,176,530 B2
(45) Date of Patent: Dec. 24, 2024

(54) ELECTRODE PLATE AND METHOD FOR MANUFACTURING SAME, AND SECONDARY BATTERY AND METHOD FOR MANUFACTURING SAME

(71) Applicant: SANYO Electric Co., Ltd., Daito (JP)

(72) Inventors: Kazuaki Tamura, Hyogo (JP); Yoshifumi Magari, Hyogo (JP); Atsutoshi Ako, Hyogo (JP); Akira Nishida, Hyogo (JP); Kentaro Tsukamoto, Hyogo (JP); Tomoyuki Yamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 648 days.

(21) Appl. No.: 17/428,558

(22) PCT Filed: Dec. 24, 2019

(86) PCT No.: PCT/JP2019/050461
§ 371 (c)(1),
(2) Date: Aug. 4, 2021

(87) PCT Pub. No.: WO2020/170598
PCT Pub. Date: Aug. 27, 2020

(65) Prior Publication Data
US 2022/0109147 A1    Apr. 7, 2022

(30) Foreign Application Priority Data
Feb. 20, 2019  (JP) .................... 2019-027969

(51) Int. Cl.
*H01M 4/46* (2006.01)
*H01M 4/02* (2006.01)

(52) U.S. Cl.
CPC ...... *H01M 4/463* (2013.01); *H01M 2004/028* (2013.01); *H01M 2220/20* (2013.01)

(58) Field of Classification Search
CPC ....... H01M 4/463; H01M 4/64; H01M 50/564
(Continued)

(56) References Cited

U.S. PATENT DOCUMENTS

| 5,718,395 A | 2/1998 | Nakanose et al. |
| 2013/0122264 A1 | 5/2013 | Fujii et al. |

(Continued)

FOREIGN PATENT DOCUMENTS

| CN | 1257569 C | 5/2006 |
| CN | 109328412 A | 2/2019 |

(Continued)

OTHER PUBLICATIONS

Office Action dated Feb. 24, 2022, issued in counterpart IN Application No. 202147035812, with English Translation. (5 pages).

(Continued)

*Primary Examiner* — James M Erwin
*Assistant Examiner* — John S Medley
(74) *Attorney, Agent, or Firm* — WHDA, LLP

(57) ABSTRACT

A positive electrode plate that has a positive electrode active material layer formed on a positive electrode core, wherein the positive electrode core has, on an edge side, a thick portion which has a thickness that is greater than the thickness of a portion of the positive electrode core that has the positive electrode active material layer formed on both sides, and the positive electrode plate has a first region that extends into the thick portion from the portion of the positive electrode core that has the positive electrode active material layer formed on both sides and a second region that is positioned outside the first region in the thick portion. The average maximum diameter of the metal crystal grains that compose the first region is smaller than those of the second region.

12 Claims, 8 Drawing Sheets

(58) Field of Classification Search
USPC .............................................. 429/218, 218.1
See application file for complete search history.

(56) References Cited

U.S. PATENT DOCUMENTS

| | | | |
|---|---|---|---|
| 2013/0344374 A1* | 12/2013 | Morishima | ......... H01M 4/1391 |
| | | | 429/231.1 |
| 2016/0036009 A1 | 2/2016 | Cho et al. | |
| 2016/0164070 A1* | 6/2016 | Sato | ...................... H01M 4/139 |
| | | | 429/233 |
| 2019/0267608 A1 | 8/2019 | Choi et al. | |

FOREIGN PATENT DOCUMENTS

| | | |
|---|---|---|
| JP | 3558762 B2 | 8/2004 |
| JP | 2010-86807 A | 4/2010 |
| JP | 2013-241293 A | 12/2013 |
| JP | 2016-33912 A | 3/2016 |
| JP | 2016-115409 A | 6/2016 |
| JP | 2016-219327 A | 12/2016 |
| KR | 10-2018-0001229 A | 1/2018 |
| WO | 2018/004177 A1 | 1/2018 |

OTHER PUBLICATIONS

The Extended European Search Report dated Mar. 3, 2022, issued in counterpart EP Application No. 19916410.4. (10 pages).
International Search Report dated Mar. 24, 2020, issued in counterpart International Application No. PCT/JP2019/050461. (3 pages).
English translation of Search Report dated Dec. 14, 2023, issued in counterpart CN Application No. 201980092200.5. (2 pages).

* cited by examiner

ELECTRODE PLATE AND METHOD FOR MANUFACTURING SAME, AND SECONDARY BATTERY AND METHOD FOR MANUFACTURING SAME

TECHNICAL FIELD

The present disclose relates to an electrode plate and a method for manufacturing the same, and a secondary battery and a method for manufacturing the same.

BACKGROUND ART

For power sources for driving an electric vehicle (EV), a hybrid electric vehicle (HEV, PHEV), and the like, secondary batteries such as an alkali secondary battery and a non-aqueous electrolyte secondary battery have been used.

In each of the secondary batteries, a bottomed cylindrical exterior member having an opening and a sealing plate that seals the opening constitute a battery case. An electrode assembly composed of a positive electrode plate, a negative electrode plate, and a separator, together with an electrolyte, is housed in the battery case. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

As the secondary battery, a secondary battery comprising a flat-shaped wound electrode assembly obtained by winding a strip-shaped positive electrode plate having a plurality of positive electrode tabs and a strip-shaped negative electrode plate having a plurality of negative electrode tabs with a strip-shaped separator therebetween has been proposed (Patent Literature 1, described below).

A technique for cutting a positive electrode plate or a negative electrode plate using a continuous oscillation laser to form a curved portion having a larger thickness than a thickness of a core body (current collector foil) constituting the positive electrode plate or the negative electrode plate in a cut portion of the core body has been proposed (Patent Literature 2, described below).

CITATION LIST

Patent Literature

PATENT LITERATURE 1: Japanese Unexamined Patent Application Publication No. 2016-115409
PATENT LITERATURE 2: Japanese Unexamined Patent Application Publication No. 2016-33912

SUMMARY

Technical Problem

It is an advantage of the present disclose to provide a highly reliable electrode plate and a secondary battery.

Solution to Problem

An electrode plate according to an aspect of the present disclosure is
an electrode plate having a core body made of metal and an active material layer formed on the core body, in which
the core body has, on an end side of the core body, a thick-walled part having a larger thickness than a thickness of a portion having the active material layer formed on both its surfaces in the core body,
the core body has a first region extending from the portion having the active material layer formed on both the surfaces in the core body into the thick-walled part and a second region positioned outside the first region in the thick-walled part,
an average of respective maximum diameters of metal crystal grains constituting the first region is smaller than an average of respective maximum diameters of metal crystal grains constituting the second region, and
a ratio (W1/W2) of a width W1 of the first region positioned in the thick-walled part to a width W2 of the thick-walled part is 0.15 or more on a cross section in a thickness direction of the core body and perpendicular to a direction in which the end side extends.

When an electrode original plate is cut by irradiation of an energy beam such as a laser, the core body is melted by the irradiation of the energy beam and a melted portion is solidified. The melted core body is solidified with it being rounded due to surface tension. Thus, a thick-walled part having a larger thickness than that in a central region of the core body is generated in a cut portion of the core body.

FIG. 11 is a sectional view in the vicinity of a cut portion of an electrode plate cut by irradiation of an energy beam such as a laser. A thick-walled part 204x having a larger thickness than that of a central region of a core body 204a is formed in a cut portion of the core body 204a. The thick-walled part 204x is composed of a melted and solidified part 204z obtained by melting and solidifying the core body 204a at the time of cutting. A boundary 900 between a non-melted part 204y that has not been melted and the melted and solidified part 204z in the core body 204a at the time of cutting is formed in a root portion of the thick-walled part 204x. On a cross section in a thickness direction of the core body 204a and perpendicular to a direction in which the cut portion extends, a length of the boundary 900 is substantially the same as a thickness of the core body 204a in a central region of the core body 204a. In such a state, the melted and solidified part 204z is easily detached from the core body 204a at the boundary 900. The melted and solidified part 204z detached from the core body 204a may damage a separator and cause a short circuit between a positive electrode plate and a negative electrode plate.

In a configuration of the electrode plate according to the aspect of the present disclosure, a boundary between the first region and the second region is formed in the thick-walled part, thus the thick-walled part formed at an end of the core body is configured not to be easily detached from the core body. Therefore, there can be provided a highly reliable secondary battery in which a short circuit between the positive electrode plate and the negative electrode plate has been suppressed.

Between a non-melted part as a region which has not been melted at the time of cutting the electrode original plate in the core body and a melted and solidified part as a region which has been melted and solidified in the core body, the sizes of metal crystal grains constituting the parts differ. In the present disclosure, the average of the respective maximum diameters of the metal crystal grains constituting the first region as the non-melted part is made smaller than the average of the respective maximum diameters of the metal crystal grains constituting the second region as the melted and solidified part. The average of the respective maximum diameters of the metal crystal grains constituting the first region is obtained by observing a plurality of metal crystal grains constituting the first region, measuring the diameter of a maximum-diameter portion in each of the crystal grains, and calculating an average value of the diameters. The average of the respective maximum diameters of the metal crystal grains constituting the second region is obtained by observing a plurality of metal crystal grains constituting the second region, measuring the diameter of a maximum-diameter portion in each of the crystal grains, and calculating an average value of the diameters.

A secondary battery according to an aspect of the present disclosure comprises the electrode plate, and another electrode plate having a different polarity from that of the electrode plate.

A method for manufacturing an electrode plate according to an aspect of the present disclosure is a method for manufacturing an electrode plate having a core body made of metal and an active material layer formed on the core body, the method including:

an active material layer formation step for forming the active material layer on the core body; and a laser-cutting step for laser-cutting the core body, in which, after the laser-cutting step, the core body has, on a cut portion of the core body, a thick-walled part having a larger thickness than a thickness of a portion having the active material layer formed on both its surfaces in the core body, the core body has a first region extending from the portion having the active material layer formed on both the surfaces in the core body into the thick-walled part and a second region positioned outside the first region in the thick-walled part, a ratio (W1/W2) of a width W1 of the first region positioned in the thick-walled part to a width W2 of the thick-walled part is 0.15 or more on a cross section in a thickness direction of the core body and perpendicular to a direction in which the cut portion extends, the first region is a non-melted part that has not been melted in the laser-cutting step, and the second region is a melted and solidified part that has been solidified after being melted in the laser-cutting step.

In the method for manufacturing the electrode plate according to the aspect of the present disclosure, the thick-walled part formed in the cut portion of the core body is configured not to be easily detached from the core body. Therefore, there can be provided a highly reliable secondary battery in which a short circuit between the positive electrode plate and the negative electrode plate has been suppressed. The method for manufacturing the secondary battery according to the aspect of the present disclosure is a method for manufacturing a secondary battery which comprises the electrode plate manufactured by the above-described method and another electrode plate having a different polarity from that of the electrode plate.

Advantageous Effect of Invention

According to the present disclose, there can be provided a highly reliable electrode plate and a secondary battery using the same.

DESCRIPTION OF EMBODIMENTS

A configuration of a rectangular secondary battery 20 as a secondary battery according to an embodiment will be described below. The present disclose is not limited to an embodiment described below.

Figure 1:
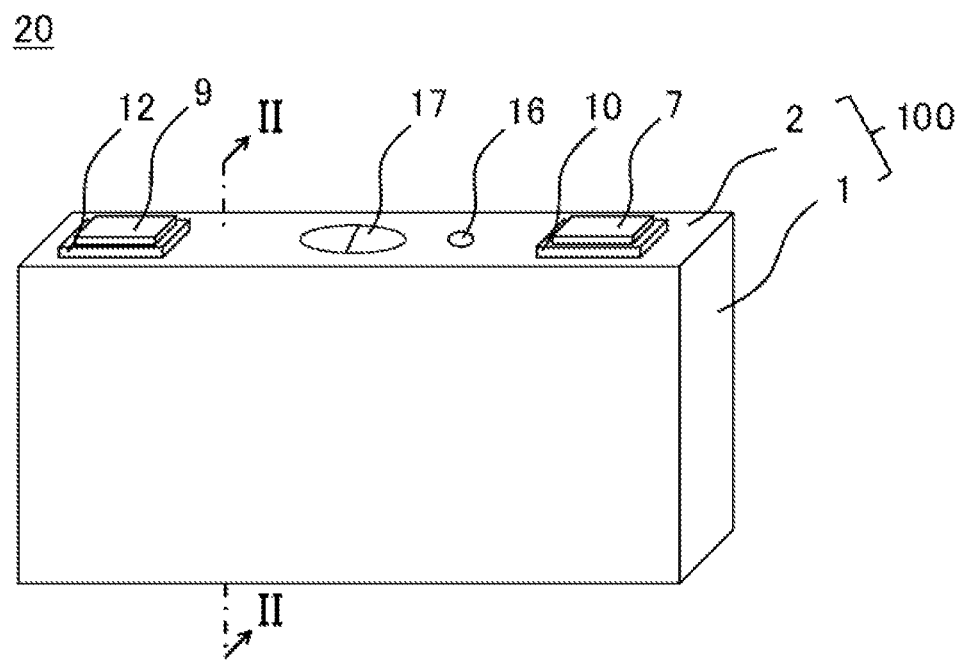
FIG. 1 is a perspective view of a secondary battery according to an embodiment.
Figure 2:
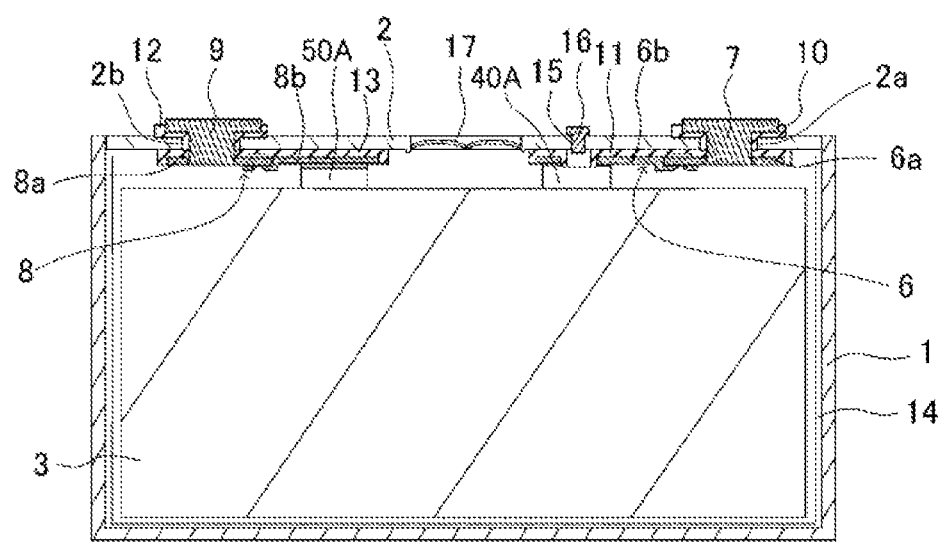
FIG. 2 is a sectional view taken along a line II-II illustrated in FIG. 1.

As illustrated in FIG. 1 and FIG. 2, the rectangular secondary battery 20 comprises a battery case 100 composed of a bottomed rectangular cylindrical-shaped rectangular exterior member 1 having an opening and a sealing plate 2 that seals the opening of the rectangular exterior member 1. The rectangular exterior member 1 and the sealing plate 2 are each preferably made of metal. A wound electrode assembly 3 including a positive electrode plate and a negative electrode plate, together with an electrolyte, is housed in the rectangular exterior member 1.

A positive electrode tab group 40A composed of a plurality of positive electrode tabs 40 and a negative electrode tab group 50A composed of a plurality of negative electrode tabs 50 are provided in an end portion on the sealing plate 2 side of the wound electrode assembly 3. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. The positive electrode current collector 6 may be one component. The first negative electrode current collector 8a and the second negative electrode current collector 8b constitute a negative electrode current collector 8. The negative electrode current collector 8 may be one component.

The first positive electrode current collector 6a, the second positive electrode current collector 6b, and the positive electrode terminal 7 are each preferably made of metal and more preferably made of aluminum or an aluminum alloy. An outer-side insulating member 10 made of resin is arranged between the positive electrode terminal 7 and the sealing plate 2. An inner-side insulating member 11 made of resin is arranged between the first and second positive electrode current collectors 6a and 6b and the sealing plate 2.

The first negative electrode current collector 8a, the second negative electrode current collector 8b, and the negative electrode terminal 9 are each preferably made of metal and more preferably made of copper or a copper alloy. The negative electrode terminal 9 preferably has a portion made of aluminum or an aluminum alloy and a portion made of copper or a copper alloy. In this case, it is preferable that the portion made of copper or a copper alloy be connected to the first negative electrode current collector 8a, and the portion made of aluminum or an aluminum alloy protrude more outwardly than the sealing plate 2. An outer-side insulating member 12 made of resin is arranged between the negative electrode terminal 9 and the sealing plate 2. An inner-side insulating member 13 made of resin is arranged between the first and second negative electrode current collectors 8a and 8b and the sealing plate 2.

An electrode assembly holder 14 composed of an insulating sheet made of resin is arranged between the wound electrode assembly 3 and the rectangular exterior member 1. The electrode assembly holder 14 is preferably shaped by bending the insulating sheet made of resin in a bag shape or a box shape. The sealing plate 2 is provided with an electrolyte solution injection hole 15, and the electrolyte solution injection hole 15 is sealed with a sealing member 16. The sealing plate 2 is provided with a gas discharge vent 17 that is broken when pressure in the battery case 100 reaches a predetermined value or more and discharges gas in the battery case 100 out of the battery case 100.

Then, details of a method for manufacturing the rectangular secondary battery 20 and each configuration in the rectangular secondary battery 20 will be described.

[Positive Electrode Plate]

First, a method for manufacturing a positive electrode plate will be described.

[Production of Positive Electrode Active Material Layer Slurry]

A lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium are kneaded such that a mass ratio of the lithium-nickel-cobalt-manganese composite oxide, the PVdF, and the carbon material is 97.5:1:1.5, to produce a positive electrode active material layer slurry.

[Production of Positive Electrode Protective Layer Slurry]

Alumina powder, a carbon material as a conductive agent, polyvinylidene fluoride (PVdF) as a binder, and N-methyl-2-pyrrolidone (NMP) as a dispersion medium are kneaded such that a mass ratio of the alumina powder, the carbon material, and the PVdF is 83:3:14, to produce a protective layer slurry.

[Formation of Positive Electrode Active Material Layer and Positive Electrode Protective Layer]

The positive electrode active material layer slurry and the positive electrode protective layer slurry produced in the above-described method are each applied to both surfaces of an aluminum foil or an aluminum alloy foil as a positive electrode core body using a die coater. At this time, the positive electrode active material layer slurry is applied to a center in a width direction of the positive electrode core body. The positive electrode protective layer slurry is applied to both ends in a width direction of a region to which the positive electrode active material layer slurry is applied.

The positive electrode core body to which the positive electrode active material layer slurry and the positive electrode protective layer slurry are applied is dried, to remove the NMP included in each of the positive electrode active material layer slurry and the positive electrode protective layer slurry. As a result, a positive electrode active material layer and a protective layer are formed. Then, the positive electrode active material layer is compressed into a positive electrode original plate 400 by being passed between a pair of press rollers.

Figure 3A:
FIG. 3(a) is a plan view of a positive electrode original plate.

FIG. 3(a) is a plan view of the positive electrode original plate 400 produced in the above-described method. On both surfaces of a strip-shaped positive electrode core body 4a, a positive electrode active material layer 4b is formed in a longitudinal direction of the positive electrode core body 4a. A positive electrode protective layer 4c is formed in both end portions in a width direction of a region where the positive electrode active material layer 4b is formed in the positive electrode core body 4a. A positive electrode core body exposure part 4d is formed in a longitudinal direction of the positive electrode original plate 400 in both end portions in a width direction of the positive electrode original plate 400. A thickness of the positive electrode active material layer 4b is preferably larger than a thickness of the positive electrode protective layer 4c.

Figure 3B:
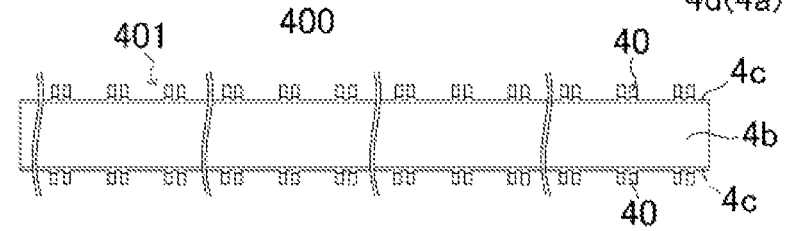
FIG. 3(b) is a plan view of a positive electrode original plate after tab formation.

FIG. 3(b) is a plan view of a positive electrode original plate 401 after tab formation. The positive electrode core body exposure part 4d in the positive electrode original plate 400 is cut into a predetermined shape, to produce the positive electrode original plate 401 after tab formation. The positive electrode original plate 400 can be cut by irradiation of an energy beam such as a laser, a metal mold, a cutter, or the like. In the positive electrode original plate 401 after tab formation, a plurality of positive electrode tabs 40 are formed in a longitudinal direction of the positive electrode original plate 401 after tab formation at both ends in a width direction of the positive electrode original plate 401 after tab formation. Each of the positive electrode tabs 40 is composed of the positive electrode core body exposure part 4d. As illustrated in FIG. 3(b), the positive electrode original plate 400 can be cut such that the positive electrode protective layer 4c remains in an end portion of the positive electrode original plate 401 after tab formation formed at a root of each of the positive electrode tabs 40 and between the adjacent positive electrode tabs 40. The positive electrode protective layer 4c is not an essential component, and can also be omitted. A portion where the positive electrode active material layer 4b is formed may be cut so that the positive electrode protective layer 4c does not remain on an end side of the positive electrode original plate 401 after tab formation formed between the adjacent positive electrode tabs 40. The positive electrode original plate 400 is preferably cut by irradiation of an energy beam to form the positive electrode tabs 40.

When the positive electrode original plate 400 is cut using the laser, an output of the laser is preferably 100 W to 1500 W, more preferably 550 W to 1000 W, and still more preferably 600 W to 1000 W. A scanning speed of the laser is preferably 100 mm/s to 5000 mm/s. However, the present invention is not limited to this. A continuous oscillation (CW) laser may be used, or a pulse laser may be used.

Figure 3C:
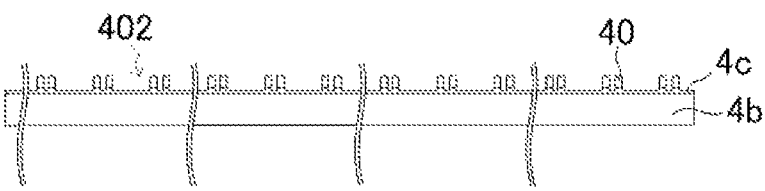
FIG. 3(c) is a plan view of a final positive electrode original plate.

FIG. 3(c) is a plan view of a final positive electrode original plate 402. In the longitudinal direction of the positive electrode original plate 401 after tab formation, the positive electrode original plate 401 after tab formation is cut in a central portion in the width direction. As a result, the final positive electrode original plate 402 the size in the width direction of which is the size of the positive electrode plate 4 is obtained. That is, the final positive electrode original plate 402 remains uncut into a length of the positive electrode plate 4 in its length direction.

Figure 3D:
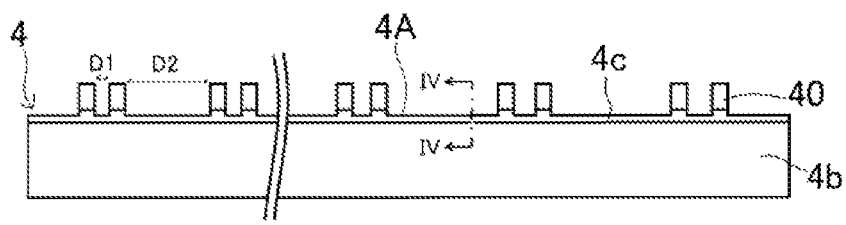
FIG. 3(d) is a plan view of a positive electrode plate.

FIG. 3(d) is a plan view of the positive electrode plate 4. The final positive electrode original plate 402 is cut into a predetermined length, to obtain the positive electrode plate 4. To further improve productivity, the final positive electrode original plate 402 is preferably cut in a process for producing a wound electrode assembly, described below. That is, a portion to be a winding-end end portion is preferably cut while or after the wound electrode assembly is wound. Three end sides other than a first end side 4A on which the positive electrode tabs 40 are formed (an end side extending in a longitudinal direction of the positive electrode plate 4 and on the opposite end side to the first end side 4A and two end sides extending in a lateral direction of the positive electrode plate 4) in the positive electrode plate 4 are preferably cut in a method other than irradiation of an energy beam, for example, a metal mold or a cutter (cutting blade). This makes it possible not to form a thick-walled part 4x in end portions of the positive electrode core body 4a respectively positioned on the three end sides other than the first end side 4A on which the positive electrode tabs 40 are formed.

To obtain a higher output secondary battery, in the wound electrode assembly 3, the positive electrode tab 40 is preferably provided for each layer of the positive electrode plate 4. That is, the number of positive electrode plates 4 to be laminated and the number of positive electrode tabs 40 to be laminated are preferably the same or substantially the same. Therefore, as illustrated in FIG. 3(d), there exist a portion where the positive electrode tabs 40 are arranged at a short distance (D1) away from each other and a portion where the positive electrode tabs 40 are arranged at a long distance (D2) away from each other in the positive electrode plate 4. In the wound electrode assembly 3, its diameter increases toward the winding outer side (outer peripheral side) from a winding center. Therefore, when the positive electrode tabs 40 are laminated, the distance D1 and the distance D2 are preferably set to gradually increase from a winding-start end portion to a winding-end end portion of the positive electrode plate 4 such that respective positions of the positive electrode tabs 40 are aligned with one another. The same applies to the negative electrode tabs 50, described below.

Figure 4:
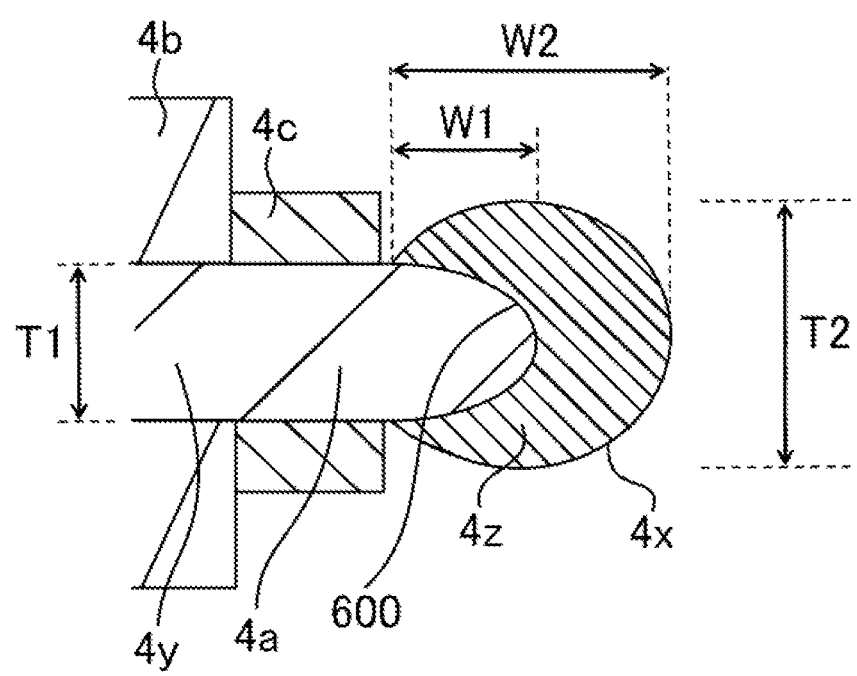
FIG. 4 is a sectional view illustrating a cross section taken along a line IV-IV illustrated in FIG. 3(d).

FIG. 4 is a sectional view taken along a line IV-IV illustrated in FIG. 3(d) and is a sectional view in the vicinity of the first end side 4A, on which the positive electrode tabs 40 are provided, in the positive electrode plate 4. As illustrated in FIG. 4, the vicinity of the first end side 4A of the positive electrode plate 4 has an active material layer non-formation region, where the positive electrode active material layer 4b is not formed, in the positive electrode core body 4a. A positive electrode protective layer 4c is formed in a portion, adjacent to the positive electrode active material layer 4b, in the active material layer non-formation region.

A thick-walled part 4x having a larger thickness than a thickness T1 of a portion having the positive electrode active material layer 4b formed on both its surfaces in the positive electrode core body 4a is formed in an end portion of the positive electrode core body 4a. The thickness of a largest-thickness portion in the thick-walled part 4x is T2.

The positive electrode core body 4a is melted by irradiation of an energy beam such as a laser and the melted positive electrode core body 4a is then solidified, thereby forming the thick-walled part 4x.

A portion, which is not melted by irradiation of an energy beam, in the positive electrode core body 4a is a non-melted part (first region) 4y. A portion, which has been melted and solidified by irradiation of an energy beam, in the positive electrode core body 4a is a melted and solidified part (second region) 4z.

As illustrated in FIG. 4, the first region 4y preferably extends to the inside of the thick-walled part 4x from a region having the positive electrode active material layer 4b formed on both its surfaces in the positive electrode core body 4a. It is preferable that first region 4y be positioned in the thick-walled part 4x, and the second region 4z be positioned outside thereof.

On a cross section illustrated in FIG. 4, i.e., a cross section in a thickness direction of the positive electrode core body 4a and perpendicular to a direction in which an end side of the positive electrode core body 4a extends, a ratio (W1/W2) of a width W1 of the non-melted part (first region) 4y positioned in the thick-walled part 4x to a width W2 of the thick-walled part 4x is preferably 0.15 or more. In such a configuration, when a boundary 600 between the non-melted part (first region) 4y and the melted and solidified part (second region) 4z is arranged in the thick-walled part 4x, the melted and solidified part (second region) 4z is not easily detached from the positive electrode core body 4a. W1/W2 is more preferably 0.2 or more, and is still more preferably 0.3 or more. W1/W2 is preferably 0.8 or less, and is more preferably 0.7 or less.

On the cross section illustrated in FIG. 4, a length of the boundary 600 is preferably 1.5 times or more the thickness T1 of the portion having the positive electrode active material layer 4b formed on both the surfaces in the positive electrode core body 4a. In such a configuration, the melted and solidified part (second region) 4z is more hardly detached from the positive electrode core body 4a.

Letting T1 be the thickness of the portion having the positive electrode active material layer 4b formed on both the surfaces in the positive electrode core body 4a, and letting T2 be the thickness of the largest-thickness portion in the thick-walled part 4x, a value of T2/T1 is preferably 1.1 to 4.0, and is more preferably 1.1 to 2.5. In such a configuration, the thick-walled part 4x does not easily contact an adjacent separator. Thus, the melted and solidified part (second region) 4z is more hardly detached from the positive electrode core body 4a.

On a cross section corresponding to FIG. 4, an average of respective maximum diameters of metal crystal grains constituting the non-melted part (first region) 4y is smaller than an average of respective maximum diameters of metal crystal grains constituting the melted and solidified part (second region) 4z.

The average of the respective maximum diameters of the metal crystal grains constituting the non-melted part 4y is calculated by observing a plurality of metal crystal grains constituting the non-melted part 4y on the cross section corresponding to FIG. 4. Specifically, the respective diameters of maximum-diameter portions in the metal crystal grains constituting the non-melted part 4y are measured, and an average value of the diameters is calculated and is set as an average of the respective maximum diameters of the crystal grains.

The average of the respective maximum diameters of the metal crystal grains constituting the second region 4z is calculated by observing a plurality of metal crystal grains constituting the second region 4z on the cross section corresponding to FIG. 4. Specifically, the respective diameters of maximum-diameter portions in the metal crystal grains constituting the second region 4z are measured, and an average value of the diameters is calculated and is set as an average of the respective maximum diameters of the crystal grains.

The average of the respective maximum diameters of the metal crystal grains constituting the non-melted part (first region) 4y can be set to 2 to 20 µm, for example. The average of the respective maximum diameters of the metal crystal grains constituting the melted and solidified part (second region) 4z can be set to 5 to 30 µm, for example. However, the present invention is not limited to this.

[Negative Electrode Plate]

Then, a method for manufacturing a negative electrode plate will be described.

[Production of Negative Electrode Active Material Layer Slurry]

Graphite as a negative electrode active material, styrene-butadiene rubber (SBR) and carboxymethyl cellulose (CMC) as a binder, and water as a dispersion medium are kneaded such that a mass ratio of the graphite, the SBR, and the CMC is 98:1:1, to produce a negative electrode active material layer slurry.

[Formation of Negative Electrode Active Material Layer]

The negative electrode active material layer slurry produced in the above-described method is applied to both surfaces of a copper foil having a thickness of 8 µm as a negative electrode core body using a die coater.

The negative electrode core body to which the negative electrode active material layer slurry is applied is dried, to remove the water included in the negative electrode active material layer slurry. As a result, a negative electrode active material layer is formed. Then, the negative electrode active material layer is compressed into a negative electrode original plate 500 by being passed between a pair of press rollers.

Figure 5:
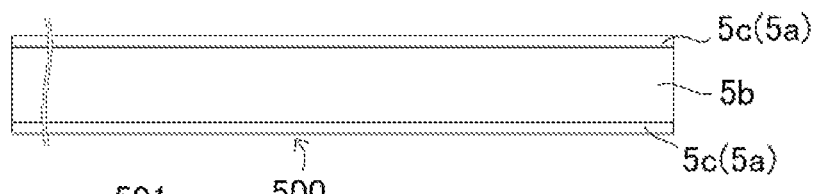
FIG. 5(a) is a plan view of a negative electrode original plate.
FIG. 5(b) is a plan view of a negative electrode original plate after tab formation.
FIG. 5(c) is a plan view of a final negative electrode original plate.
FIG. 5(d) is a plan view of a negative electrode plate.
Figure 5:
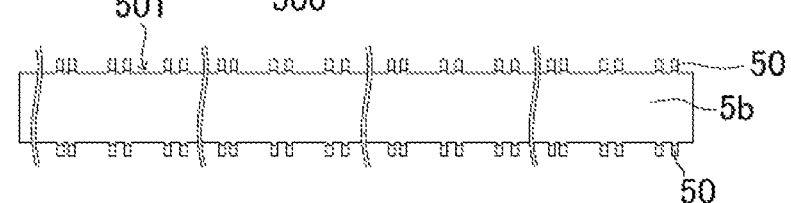
Figure 5:
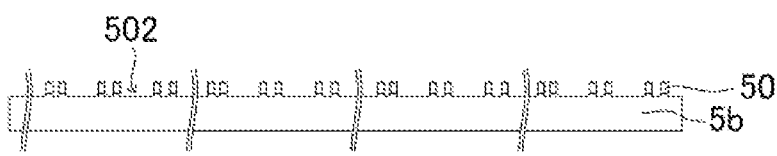
Figure 5:
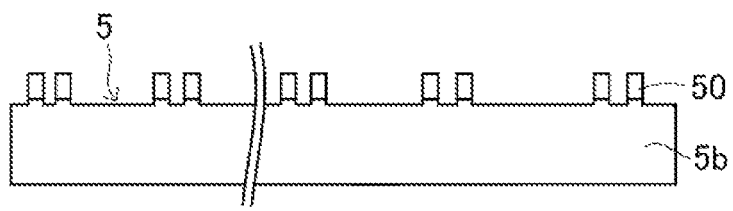

FIG. 5(a) is a plan view of the negative electrode original plate 500 produced in the above-described method. On both surfaces of a strip-shaped negative electrode core body 5a, a negative electrode active material layer 5b is formed in a longitudinal direction of the negative electrode core body 5a. A negative electrode core body exposure part 5c is formed in a longitudinal direction of the negative electrode original plate 500 in both end portions in a width direction of the negative electrode original plate 500.

FIG. 5(b) is a plan view of a negative electrode original plate 501 after tab formation. The negative electrode core body exposure part 5c in the negative electrode original plate 501 after tab formation is cut into a predetermined shape, to produce the negative electrode original plate 501 after tab formation. The negative electrode original plate 500 can be cut by irradiation of an energy beam such as a laser, a metal mold, a cutter, or the like. In the negative electrode original plate 501 after tab formation, a plurality of negative electrode tabs 50 are formed in a longitudinal direction of the negative electrode original plate 501 after tab formation at both ends in a width direction of the negative electrode original plate 501 after tab formation. Each of the negative electrode tabs 50 is composed of the negative electrode core body exposure part 5c. The negative electrode original plate 500 is preferably cut by irradiation of an energy beam to form the negative electrode tabs 50.

FIG. 5(c) is a plan view of a final negative electrode original plate 502. In the longitudinal direction of the negative electrode original plate 501 after tab formation, the negative electrode original plate 501 after tab formation is cut in a central portion in the width direction. As a result, the final negative electrode original plate 502 the size in the width direction of which is the size of a negative electrode plate 5 is obtained. That is, the final negative electrode original plate 502 remains uncut into a length of the negative electrode plate 5 in its length direction.

FIG. 5(d) is a plan view of the negative electrode plate 5. The final negative electrode original plate 502 is cut into a predetermined length, to obtain the negative electrode plate 5. To further improve productivity, the final negative electrode original plate 502 is preferably cut in a process for producing a wound electrode assembly, described below. That is, a portion to be a winding-end end portion is preferably cut while or after the wound electrode assembly is wound.

[Production of Wound Electrode Assembly]

The positive electrode plate 4 and the negative electrode plate 5 produced in the above-described method are each wound with a strip-shaped separator 70 made of polyolefin therebetween, to manufacture the flat-shaped wound electrode assembly 3. As described above, one end of the final positive electrode original plate 402 and one end of the final negative electrode original plate 502 are fed to a winding device, and the final positive electrode original plate 402 and the final negative electrode original plate 502 are preferably respectively cut at predetermined positions while or after the winding.

Figure 6:
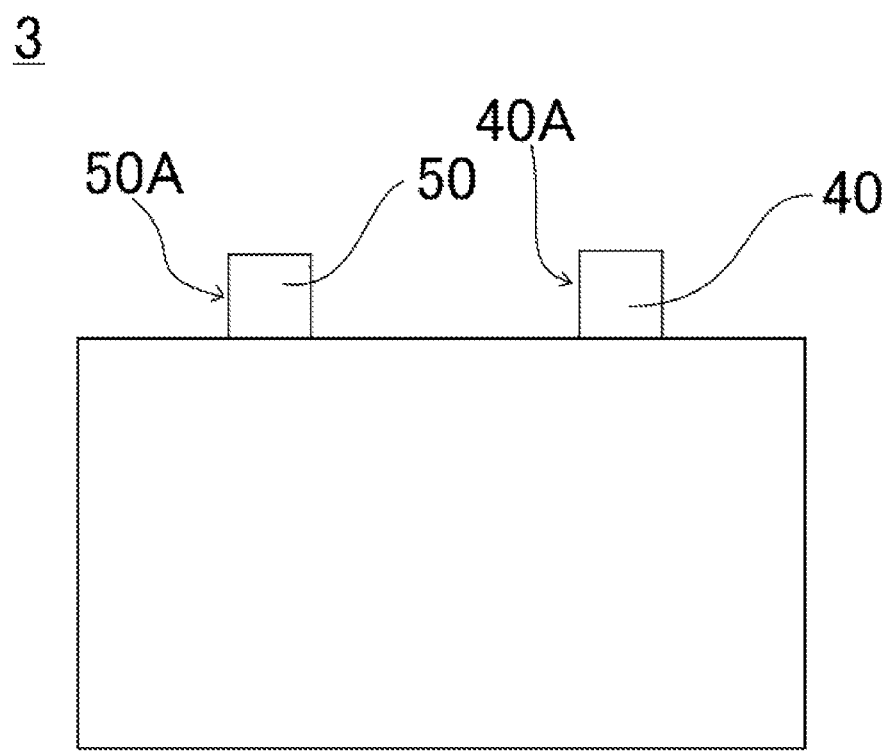
FIG. 6 is a plan view of a wound electrode assembly according to the embodiment.

FIG. 6 is a plan view of the wound electrode assembly 3. In the wound electrode assembly 3, the positive electrode tab group 40A composed of the plurality of positive electrode tabs 40 and the negative electrode tab group 50A composed of the plurality of negative electrode tabs 50 are provided in one end portion in a direction in which a winding axis extends.

In the wound electrode assembly 3, when the number of positive electrode plates 4 to be laminated is set to N1 (layers), the number of positive electrode tabs 40 to be laminated is preferably 0.8×N1 or more and more preferably 0.9×N1 or more.

In the wound electrode assembly 3, when the number of negative electrode plates 5 to be laminated is set to N2 (layers), the number of negative electrode tabs 50 to be laminated is preferably 0.8×N2 or more and more preferably 0.9×N2 or more.

[Connection Between Current Collector and Tab]

Figure 7:
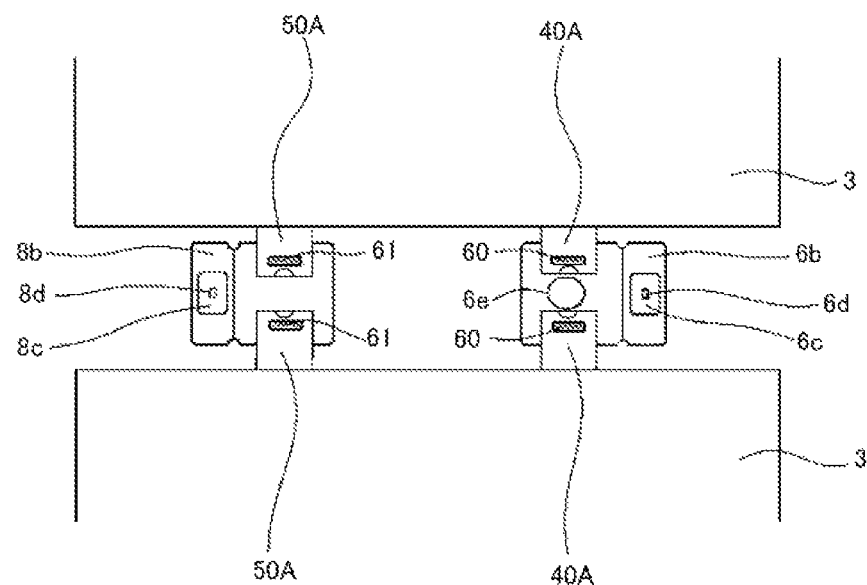
FIG. 7 is a diagram illustrating a state where a positive electrode tab group is connected to a second positive electrode current collector and a negative electrode tab group is connected to a second negative electrode current collector.

As illustrated in FIG. 7, respective positive electrode tab groups 40A in two wound electrode assemblies 3 are connected to the second positive electrode current collector 6b, and respective negative electrode tab groups 50A in the two wound electrode assemblies 3 are connected to the second negative electrode current collector 8b. The positive electrode tab groups 40A are bonded to the second positive electrode current collector 6b, to respectively form bonding parts 60. The negative electrode tab groups 50A are bonded to the second negative electrode current collector 8b, to respectively form bonding parts 61. As a bonding method, ultrasonic welding (ultrasonic bonding), resistance welding, laser welding, or the like can be used.

A thin-walled part 6c is formed in the second positive electrode current collector 6b, and a current collector opening 6d is formed in the thin-walled part 6c. In the thin-walled part 6c, the second positive electrode current collector 6b is bonded to the first positive electrode current collector 6a. In the second positive electrode current collector 6b, a current collector through hole 6e is formed at a position opposing the electrolyte solution injection hole 15 in the sealing plate 2. A thin-walled part 8c is formed in the second negative electrode current collector 8b, and a current collector opening 8d is formed in the thin-walled part 8c. In the thin-walled part 8c, the second negative electrode current collector 8b is bonded to the first negative electrode current collector 8a.

[Attachment of Each Component to Sealing Plate]

Figure 8:
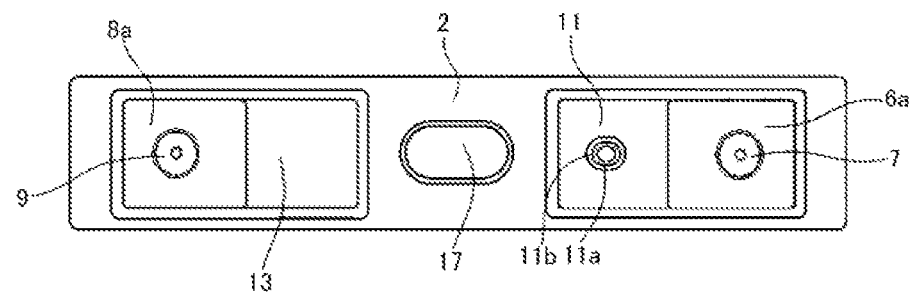
FIG. 8 is a diagram illustrating a surface on the electrode assembly side of a sealing plate after the first positive electrode current collector and the first negative electrode current collector are attached.

FIG. 8 is a diagram illustrating a surface on the battery inner side of the sealing plate 2 to which each of components is attached. Each of the components is attached to the sealing plate 2 in the following manner.

The outer-side insulating member 10 is arranged on the battery outer surface side around a positive electrode terminal insertion hole 2a of the sealing plate 2. The inner-side insulating member 11 and the first positive electrode current collector 6a are arranged on the battery inner surface side around the positive electrode terminal insertion hole 2a of the sealing plate 2. The positive electrode terminal 7 is inserted into a through-hole of the outer-side insulating member 10, the positive electrode terminal insertion hole 2a of the sealing plate 2, a through-hole of the inner-side insulating member 11, and a through-hole of the first positive electrode current collector 6a from the battery outer side, to caulk a distal end of the positive electrode terminal 7 onto the first positive electrode current collector 6a. As a result, the positive electrode terminal 7 and the first positive electrode current collector 6a are fixed to the sealing plate 2. A portion caulked in the positive electrode terminal 7 and the first positive electrode current collector 6a are preferably welded to each other.

The outer-side insulating member 12 is arranged on the battery outer surface side around a negative electrode terminal insertion hole 2b of the sealing plate 2. The inner-side insulating member 13 and the first negative electrode current collector 8a are arranged on the battery inner surface side around the negative electrode terminal insertion hole 2b of the sealing plate 2. The negative electrode terminal 9 is inserted into a through-hole of the outer-side insulating member 12, the negative electrode terminal insertion hole 2b of the sealing plate 2, a through-hole of the inner-side insulating member 13, and a through hole of the first negative electrode current collector 8a from the battery outer side, to caulk a distal end of the negative electrode terminal 9 onto the first negative electrode current collector 8a. As a result, the negative electrode terminal 9 and the first negative electrode current collector 8a are fixed to the sealing plate 2. A portion caulked in the negative electrode terminal 9 and the first negative electrode current collector 8a are preferably welded to each other.

A portion, which opposes the electrolyte solution injection hole 15 provided in the sealing plate 2, in the inner-side insulating member 11 is provided with an injection opening 11a. An edge portion of the injection opening 11a is provided with a cylindrical part 11b.

[Connection Between First Current Collector and Second Current Collector]

Figure 9:
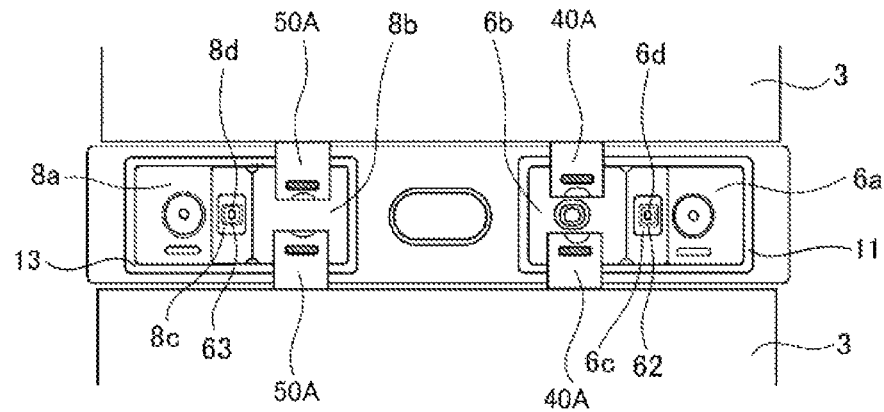
FIG. 9 is a diagram illustrating a surface on the electrode assembly side of the sealing plate after the second positive electrode current collector is attached to the first positive electrode current collector and the second negative electrode current collector is attached to the first negative electrode current collector.

FIG. 9 is a diagram illustrating a surface on the battery inner side of the sealing plate 2 after the second positive electrode current collector 6b is attached to the first positive electrode current collector 6a and the second negative electrode current collector 8b is attached to the first negative electrode current collector 8a.

The second positive electrode current collector 6b to which the positive electrode tab group 40A is connected is arranged on the inner-side insulating member 11 such that its part overlaps the first positive electrode current collector 6a. The thin-walled part 6c is irradiated with a laser, to bond the second positive electrode current collector 6b and the first positive electrode current collector 6a to each other. As a result, a bonding part 62 is formed. The second negative electrode current collector 8b to which the negative electrode tab group 50A is connected is arranged on the inner-side insulating member 13 such that its part overlaps the first negative electrode current collector 8a. The thin-walled part 8c is irradiated with a laser, to bond the second negative electrode current collector 8b and the first negative electrode current collector 8a to each other. As a result, a bonding part 63 is formed.

[Production of Secondary Battery]

The two positive electrode tab groups 40A and the two negative electrode tab groups 50A are bent such that an upper surface of one of the wound electrode assemblies 3 and an upper surface of the other wound electrode assembly 3 in FIG. 9 contact each other directly or via another member. As a result, the two wound electrode assemblies 3 are combined into one. The two wound electrode assemblies 3 are arranged in the electrode assembly holder 14 composed of an insulating sheet shaped in a box shape or a bag shape.

The one positive electrode tab group 40A and the other positive electrode tab group 40A respectively remain bent in different directions. The one negative electrode tab group 50A and the other negative electrode tab group 50A respectively remain bent in different directions.

The two wound electrode assemblies 3 wrapped by the electrode assembly holder 14 are inserted into the rectangular exterior member 1. The sealing plate 2 and the rectangular exterior member 1 are welded to each other, and the opening of the rectangular exterior member 1 is sealed with the sealing plate 2. An electrolyte solution is injected into the rectangular exterior member 1 via the electrolyte solution injection hole 15 provided in the sealing plate 2. Then, the electrolyte solution injection hole 15 is sealed with the sealing member 16 such as a blind rivet. As a result, the rectangular secondary battery 20 is completed.

Positive electrode plates respectively associated with samples 1 to 7 were produced in the following method.

[Sample 1]

A positive electrode original plate was produced in the above-described method using an aluminum alloy foil having a thickness of 15 μm composed of an aluminum 3003 material (A3003) in the Japanese Industrial Standards JIS as a positive electrode core body.

The positive electrode original plate was cut using a continuous oscillation laser, to produce a positive electrode original plate after tab formation. Conditions of the laser were an output of 600 W, a scanning speed of 4000 mm/s, and a spot diameter of 19.3 μm.

Then, the positive electrode original plate after tab formation was cut into a predetermined size using a cutter, to obtain a positive electrode plate in the sample 1.

[Sample 2]

A positive electrode original plate was produced in the above-described method using an aluminum alloy foil having a thickness of 15 μm composed of an aluminum 3003 material (A3003) in the Japanese Industrial Standards JIS as a positive electrode core body.

The positive electrode original plate was cut using a continuous oscillation laser, to produce a positive electrode original plate after tab formation. Conditions of the laser were an output of 900 W, a scanning speed of 4000 mm/s, and a spot diameter of 19.3 μm.

Then, the positive electrode original plate after tab formation was cut into a predetermined size using a cutter, to obtain a positive electrode plate in the sample 2.

[Sample 3]

A positive electrode original plate was produced in the above-described method using an aluminum alloy foil having a thickness of 15 μm composed of an aluminum 1085 material (A1085) in the Japanese Industrial Standards JIS as a positive electrode core body.

The positive electrode original plate was cut using a continuous oscillation laser, to produce a positive electrode original plate after tab formation. Conditions of the laser were an output of 600 W, a scanning speed of 4000 mm/s, and a spot diameter of 19.3 μm.

Then, the positive electrode original plate after tab formation was cut into a predetermined size using a cutter, to obtain a positive electrode plate in the sample 3.

[Sample 4]

A positive electrode original plate was produced in the above-described method using an aluminum alloy foil having a thickness of 15 μm composed of an aluminum 1085 material (A1085) in the Japanese Industrial Standards JIS as a positive electrode core body.

The positive electrode original plate was cut using a continuous oscillation laser, to produce a positive electrode original plate after tab formation. Conditions of the laser were an output of 900 W, a scanning speed of 4000 mm/s, and a spot diameter of 19.3 μm.

Then, the positive electrode original plate after tab formation was cut into a predetermined size using a cutter, to obtain a positive electrode plate in the sample 4.

[Sample 5]

A positive electrode original plate was produced in the above-described method using an aluminum alloy foil having a thickness of 15 μm composed of an aluminum 3003 material (A3003) in the Japanese Industrial Standards JIS as a positive electrode core body.

The positive electrode original plate was cut using a continuous oscillation laser, to produce a positive electrode original plate after tab formation. Conditions of the laser were an output of 900 W, a scanning speed of 4000 mm/s, and a spot diameter of 30.2 μm.

Then, the positive electrode original plate after tab formation was cut into a predetermined size using a cutter, to obtain a positive electrode plate in the sample 5.

[Sample 6]

A positive electrode original plate was produced in the above-described method using an aluminum alloy foil having a thickness of 15 μm composed of an aluminum 3003 material (A3003) in the Japanese Industrial Standards JIS as a positive electrode core body.

The positive electrode original plate was cut using a continuous oscillation laser, to produce a positive electrode original plate after tab formation. Conditions of the laser were an output of 900 W, a scanning speed of 2000 mm/s, and a spot diameter of 30.2 μm.

Then, the positive electrode original plate after tab formation was cut into a predetermined size using a cutter, to obtain a positive electrode plate in the sample 6.

[Sample 7]

A positive electrode original plate was produced in the above-described method using an aluminum alloy foil having a thickness of 20 μm composed of an aluminum 3003 material (A3003) in the Japanese Industrial Standards JIS as a positive electrode core body.

The positive electrode original plate was cut using a continuous oscillation laser, to produce a positive electrode original plate after tab formation. Conditions of the laser were an output of 900 W, a scanning speed of 4000 mm/s, and a spot diameter of 30.2

Then, the positive electrode original plate after tab formation was cut into a predetermined size using a cutter, to obtain a positive electrode plate in the sample 7.

For the positive electrode plates in the samples 1 to 7, a cross section corresponding to FIG. 4 was observed, to measure a width W1 (μm) of the first region $4y$ positioned in the thick-walled part $4x$ and a width W2 of the thick-walled part $4x$. A material for the positive electrode core body in each of the samples, a thickness of the electrode core body, a cutting condition, and a value of W1/W2 are shown in Table 1.

TABLE 1

| | Material for positive electrode core body | Thickness of positive electrode core body (μm) | Output of laser (W) | Scanning speed of laser (mm/s) | Spot diameter of laser (μm) | W1/W2 |
|---|---|---|---|---|---|---|
| Sample 1 | A3003 | 15 | 600 | 4000 | 19.3 | 0.553 |
| Sample 2 | A3003 | 15 | 900 | 4000 | 19.3 | 0.553 |
| Sample 3 | A1085 | 15 | 600 | 4000 | 19.3 | 0.000 |
| Sample 4 | A1085 | 15 | 900 | 4000 | 19.3 | 0.000 |
| Sample 5 | A3003 | 15 | 900 | 4000 | 30.2 | 0.195 |
| Sample 6 | A3003 | 15 | 900 | 2000 | 30.2 | 0.000 |
| Sample 7 | A3003 | 20 | 900 | 4000 | 30.2 | 0.255 |

As shown in Table 1, it is understood that the value of W1/W2 can be changed by the material for the positive electrode core body, a thickness of the positive electrode core body, and the cutting condition (laser condition). It is considered that the value of the W1/W2 can be increased by suppressing a portion to be melted in the positive electrode core body to the minimum necessary at the time of cutting.

It is considered that the positive electrode core body is not more easily melted so that the value of W1/W2 is more easily increased by using an aluminum alloy foil including Mn as the positive electrode core body than using a pure aluminum foil in the samples 3 and 4, for example. An amount of Mn included in the aluminum alloy foil constituting the positive electrode core body is preferably 0.5 to 2% by mass.

[Modification 1]

Figure 10:
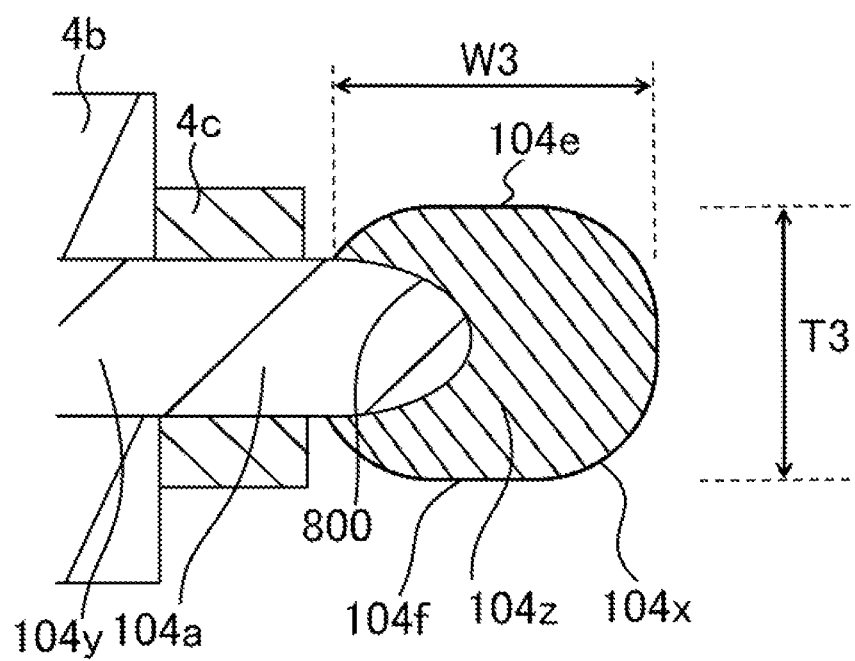
FIG. 10 is a sectional view according to a modification 1, corresponding to FIG. 4.
Figure 11:
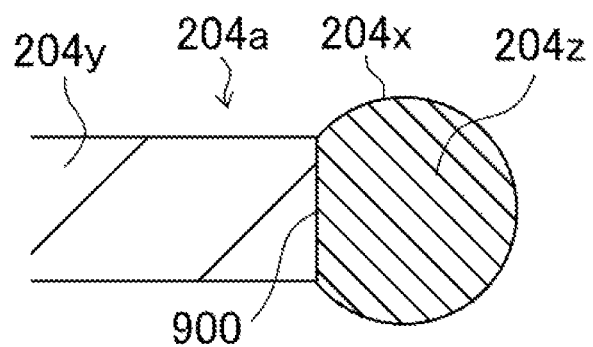
FIG. 11 is a sectional view according to a reference example, corresponding to FIG. 4.

FIG. 10 is a sectional view corresponding to FIG. 4 of a positive electrode plate according to a modification 1. A positive electrode active material layer $4b$ is formed on both surfaces of a positive electrode core body $104a$ made of aluminum or an aluminum alloy. A positive electrode protective layer $4c$ is formed on both surfaces in the vicinity of an end portion of the positive electrode active material layer $4b$ in the positive electrode core body $104a$. A thick-walled part $104x$ is formed in an end portion as a cut portion of the positive electrode core body $104a$. A non-melted part (first region) $104y$ that has not been melted at the time of cutting extends to the inside of the thick-walled part $104x$ from a portion having the positive electrode active material layer $4b$ formed on both its surfaces in the positive electrode core body $104a$. In the thick-walled part $104x$, a melted and solidified part (second region) $104z$ is formed outside the non-melted part (first region) $104y$. The melted and solidified part (second region) $104z$ is a portion where the positive electrode core body 104a has been melted and solidified by irradiation of an energy beam. A boundary 800 between the non-melted part 104y and the melted and solidified part 104z is formed in the thick-walled part 104x.

On a cross section in a thickness direction of the positive electrode core body 104a and perpendicular to a direction in which the cut portion extends, the thick-walled part 104x has a flat shape. A width W3 of the thick-walled part 104x is larger than a thickness T3 of a largest-thickness portion in the thick-walled part 104x. A flat part 104e is formed on an upper surface of the thick-walled part 104x. A flat part 104f is formed on a lower surface of the thick-walled part 104x.

It is considered that the larger a portion to be melted in the positive electrode core body is, the closer a cross-sectional shape of a thick-walled part formed in a cut portion of a positive electrode core body when the positive electrode core body is cut by irradiation of an energy beam comes to a spherical shape. In the above-described respective positive electrode plates in the samples 1 and 2, the melting of the positive electrode core body is suppressed to the minimum necessary, and the cross-sectional shape of the thick-walled part is a flat shape, like in the modification 1.

When the cross-sectional shape of the thick-walled part is a flat shape, the thick-walled part does not more easily contact an adjacent separator so that the thick-walled part can be more effectively prevented from being detached from the positive electrode core body, like when the cross-sectional shape of the thick-walled part is a spherical shape.

OTHERS

Although an example in which the electrode core body made of aluminum or an aluminum alloy is used as a positive electrode core body is illustrated in the above-described embodiment, an electrode core body made of aluminum or an aluminum alloy may be used as a negative electrode core body. The electrode core body may be made of metal, or may be made of copper or a copper alloy.

Although an example in which the positive electrode plate is provided with the protective layer is illustrated in the above-described embodiment, the protective layer is not an essential component. The protective layer need not be provided.

Although an example in which the two wound electrode assemblies are arranged in the battery case has been illustrated in the above-described embodiment, the number of wound electrode assemblies may be one, or may be three or more. An electrode assembly may be a layered electrode assembly.

Although an example in which each of the positive electrode current collector and the negative electrode current collector is composed of two components has been illustrated in the above-described embodiment, each of the positive electrode current collector and the negative electrode current collector may be composed of one component. If each of the positive electrode current collector and the negative electrode current collector is composed of one component, the positive electrode current collector and the negative electrode current collector are preferably respectively connected to the positive electrode terminal and the negative electrode terminal attached to the sealing plate after a positive electrode tab group and a negative electrode tab group are respectively connected to the positive electrode current collector and the negative electrode current collector.

Known materials can be respectively used for a positive electrode plate, a negative electrode plate, a separator, an electrolyte, and the like.

REFERENCE SIGNS LIST 20 rectangular secondary battery
1 rectangular exterior member
2 sealing plate
2a positive electrode terminal insertion hole
2b negative electrode terminal insertion hole
100 battery case
3 wound electrode assembly
4 positive electrode plate
4A first end side
4a positive electrode core body
4b positive electrode active material layer
4c positive electrode protective layer
4d positive electrode core body exposure part
4x thick-walled part
4y non-melted part (first region)
4z melted and solidified part (second region)
600 boundary
40 positive electrode tab
40A positive electrode tab group
400 positive electrode original plate
401 positive electrode original plate after tab formation
402 final positive electrode original plate
5 negative electrode plate
5a negative electrode core body
5b negative electrode active material layer
5c negative electrode core body exposure part
50 negative electrode tab
50A negative electrode tab group
500 negative electrode original plate
501 negative electrode original plate after tab formation
502 final negative electrode original plate
6 positive electrode current collector
6a first positive electrode current collector
6b second positive electrode current collector
6c thin-walled part
6d current collector opening
6e current collector through hole
7 positive electrode terminal
8 negative electrode current collector
8a first negative electrode current collector
8b second negative electrode current collector
8c thin-walled part
8d current collector opening
9 negative electrode terminal
10 outer-side insulating member
11 inner-side insulating member
11a injection opening
11b cylindrical part
12 outer-side insulating member
13 inner-side insulating member
14 electrode assembly holder
15 electrolyte solution injection hole
16 sealing member
17 gas discharge vent
60, 61, 62, 63 bonding part
104a positive electrode core body
104e, 104f flat part
104x thick-walled part
104y non-melted part (first region)
104z melted and solidified part (second region)
800 boundary 204a core body
204x thick-walled part
204y non-melted part (first region)
204z melted and solidified part (second region)
900 boundary

The invention claimed is:

1. An electrode plate having a core body made of metal and an active material layer formed on the core body, wherein
the core body has a thick-walled part on an end side of the core body, the thick-walled part having a larger thickness than a thickness of a portion of the core body having the active material layer formed on both surfaces of the core body,
the core body includes:
a first region extending from the portion of the core body having the active material layer formed on the both surfaces of the core body and having a distal end portion thereof protruding into the thick-walled part in a protruding direction; and
a second region positioned outside the distal end portion of the first region of the thick-walled part,
an average of respective maximum diameters of metal crystal grains constituting the first region is smaller than an average of respective maximum diameters of metal crystal grains constituting the second region, and
a ratio (W1/W2) of a width W1 of the distal end portion of the first region in the protruding direction to a width W2 of the thick-walled part in the protruding direction is 0.15 or more and no more than 1 on a cross section in a thickness direction of the core body and perpendicular to a direction in which the end side extends.

2. The electrode plate according to claim 1, wherein a length of a boundary between the first region and the second region is 1.5 times or more the thickness of the portion having the active material layer formed on the both surfaces of the core body on the cross section in the thickness direction of the core body and perpendicular to the direction in which the end side extends.

3. The electrode plate according to claim 1, wherein the core body is made of aluminum or an aluminum alloy.

4. The electrode plate according to claim 1, wherein the width W2 of the thick-walled part is larger than a maximum thickness of the thick-walled part on the cross section in the thickness direction of the core body and perpendicular to the direction in which the end side extends.

5. A secondary battery comprising:
the electrode plate according to claim 1; and
another electrode plate having a different polarity from that of the electrode plate.

6. A method for manufacturing an electrode plate having a core body made of metal and an active material layer formed on the core body, the method including:
an active material layer formation step for forming the active material layer on the core body; and
a laser-cutting step for laser-cutting the core body, wherein,
after the laser-cutting step, the core body has a thick-walled part on a cut portion of the core body, the thick-walled part having a larger thickness than a thickness of a portion of the core body having the active material layer formed on both surfaces of the core body,
the core body includes:
a first region extending from the portion having the active material layer formed on the both surfaces of the core body and having a distal end portion thereof protruding into the thick-walled part in a protruding direction; and
a second region positioned outside the distal end portion of the first region of the thick-walled part,
a ratio (W1/W2) of a width W1 of the distal end portion of the first region in the protruding direction to a width W2 of the thick-walled part in the protruding direction is 0.15 or more and no more than 1 on a cross section in a thickness direction of the core body and perpendicular to a direction in which the cut portion extends,
the first region is a non-melted part that has not been melted in the laser-cutting step, and
the second region is a melted and solidified part that has been solidified after being melted in the laser-cutting step.

7. The method for manufacturing the electrode plate according to claim 6, wherein a length of a boundary between the first region and the second region is 1.5 times or more the thickness of the portion having the active material layer formed on the both surfaces of the core body on the cross section in the thickness direction of the core body and perpendicular to the direction in which the cut portion extends, after the laser-cutting step.

8. The method for manufacturing the electrode plate according to claim 6, wherein the core body is made of aluminum or an aluminum alloy.

9. The method for manufacturing the electrode plate according to claim 6, wherein the width W2 of the thick-walled part is larger than a maximum thickness of the thick-walled part on the cross section in the thickness direction of the core body and perpendicular to the direction in which the cut portion extends.

10. A method for manufacturing a secondary battery, the secondary battery comprising:
the electrode plate manufactured by the manufacturing method according to claim 6; and
another electrode plate having a different polarity from that of the electrode plate.

11. An electrode plate having a core body made of metal and an active material layer formed on the core body, wherein
the core body has a thick-walled part on an end side of the core body, the thick-walled part having a larger thickness than a thickness of a portion of the core body having the active material layer formed on both surfaces of the core body,
the core body has a first region extending from the portion having the active material layer formed on the both surfaces of the core body into the thick-walled part and a second region positioned outside the first region in the thick-walled part,
an average of respective maximum diameters of metal crystal grains constituting the first region is smaller than an average of respective maximum diameters of metal crystal grains constituting the second region, and
a ratio (W1/W2) of a width W1 of the first region positioned in the thick-walled part to a width W2 of the thick-walled part is 0.15 or more on a cross section in a thickness direction of the core body and perpendicular to a direction in which the end side extends, and
a length of a boundary between the first region and the second region is 1.5 times or more the thickness of the portion having the active material layer formed on the both surfaces of the core body on the cross section in the thickness direction of the core body and perpendicular to the direction in which the end side extends.

12. A method for manufacturing the electrode plate according to claim 11,
the method including:
an active material layer formation step for forming the active material layer on the core body; and
a laser-cutting step for laser-cutting the core body, wherein
the first region is a non-melted part that has not been melted in the laser-cutting step, and
the second region is a melted and solidified part that has been solidified after being melted in the laser-cutting step.

\* \* \* \* \*